Figure 4:
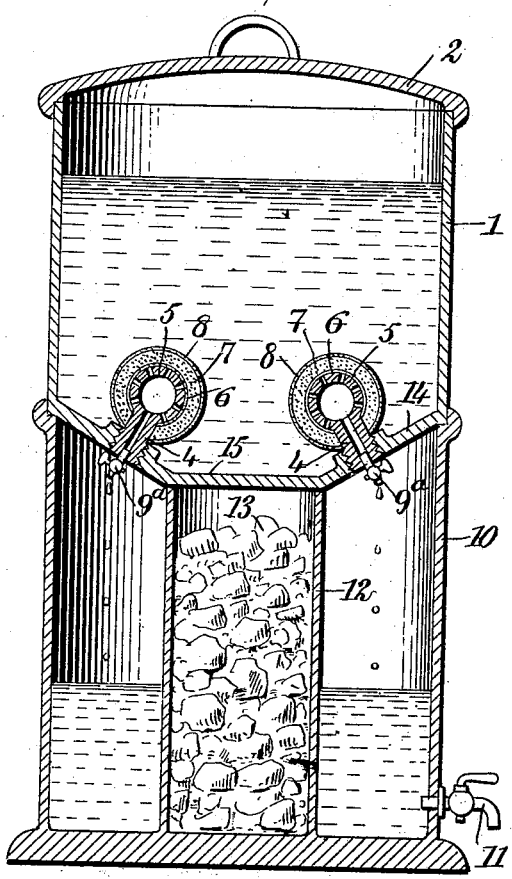

No. 869,045. PATENTED OCT. 22, 1907.
P. A. AURNESS.
COMBINED WATER HEATER, FILTER, AND COOLER.
APPLICATION FILED OCT. 24, 1906.
2 SHEETS—SHEET 1.
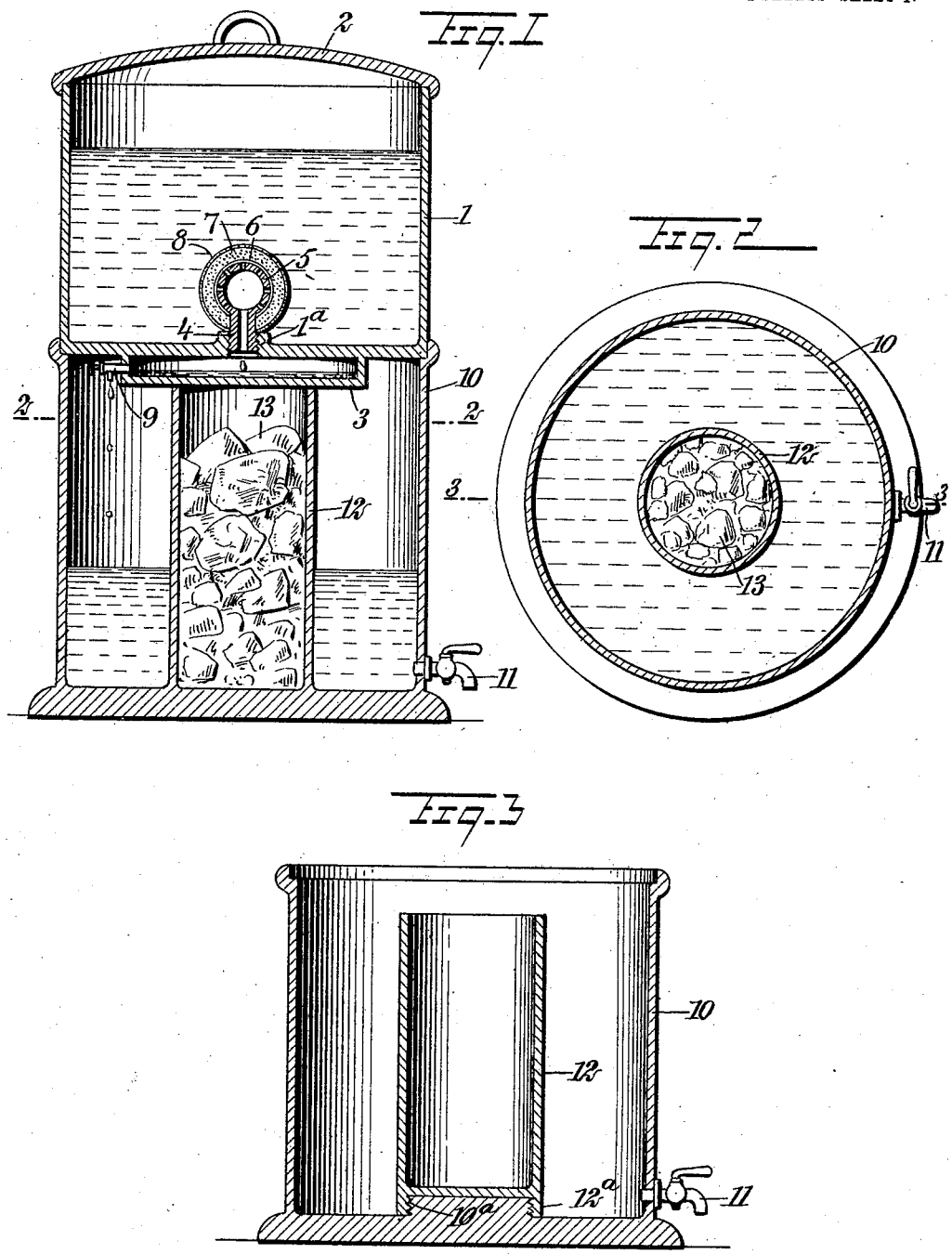
WITNESSES
INVENTOR
Peter A. Aurness
BY Munn & Co
ATTORNEYS No. 869,045. PATENTED OCT. 22, 1907.
P. A. AURNESS.
COMBINED WATER HEATER, FILTER, AND COOLER.
APPLICATION FILED OCT. 24, 1906.

2 SHEETS—SHEET 2.

WITNESSES
H. Walker

INVENTOR
Peter A. Aurness
BY
Munn & Co
ATTORNEYS

UNITED STATES PATENT OFFICE.

PETER A. AURNESS, OF MINNEAPOLIS, MINNESOTA.

COMBINED WATER HEATER, FILTER, AND COOLER

No. 869,045.      Specification of Letters Patent.      Patented Oct. 22, 1907.

Application filed October 24, 1906. Serial No. 340,322.

To all whom it may concern:

Be it known that I, PETER A. AURNESS, a citizen of the United States, and a resident of Minneapolis, in the county of Hennepin and State of Minnesota, have invented a new and Improved Combined Water Heater, Filter, and Cooler, of which the following is a full, clear, and exact description.

This invention relates to reservoirs adapted to contain drinking water, and particularly to a combined filtering, cooling and heating apparatus, and has for its general object to provide means adapted to furnish water for drinking purposes that is absolutely void of pathogenic bacteria, and at the same time cooled and aerated.

My invention has for its further object to provide a device of the kind stated, which is simple in construction and adapted to be readily taken apart, scoured, cleaned or sterilized when desired.

A further object of my invention is to provide a water boiler with a main and an auxiliary water chamber and an intermediate filter detachably connected with said chambers.

Another object of my invention is to provide an exit for the boiled and filtered water from the auxiliary chamber, adapted to permit the water to run by gravity into a receiving chamber for sterilized water, and so constructed as to be readily closed when desired, and so arranged as not to interfere with the bottom of said chambers when placed over a fire for the purpose of heating the water in said chambers.

A further object of my invention is to provide detachable filters having proportionately large filtering surfaces more or less globular in form, and adapted to be detachably connected with the receiving chamber.

Other objects relating to the specific construction and the special arrangement of the several parts of my invention will be understood by the following description and the accompanying drawings, in which drawings Figure 1 is a vertical central section of the combined heater, filter and cooler embodying my invention; Fig. 2 is a horizontal section of the same, taken on the line 2—2 of Fig. 1; Fig. 3 is a vertical central section of my device with the heating receptacle removed, taken on the line 3—3 of Fig. 2; Fig. 4 is a central vertical section of a device embodying a modification of my invention.

As illustrated in the drawings, 1 represents a receiving chamber which may be of any suitable construction, and provided with a top or cover 2 adapted to be detached from the receiving chamber 1, or, if desired, hinged thereto. An auxiliary chamber 3 is preferably formed integral with the bottom of the receiving receptacle, and it is provided with a threaded connecting aperture 1ª adapted to communicate with the receiving chamber 1, and to receive the threaded neck 4 of a filter arranged within the receiving chamber 1. One or more of these filters may be arranged within the receiving chambers and may be made of any suitable construction. I prefer, however, to make the filters in the form of spherical bulbs, consisting of an inner perforated shell 5 formed on the threaded stem or neck 4. The surfaces of the filters are covered with layers 6, 7 and 8 of different filtering material, which are detachably secured around the neck 4 of the filter, so as to be readily removed and replaced when desired, or when occasion requires the entire filter may be detached from the receiving chamber and replaced by fresh ones. The auxiliary chamber 3 is provided with a drip cock 9 arranged above the bottom of the chamber, so as to be protected from injury when the receiving chamber is placed over a fire to heat the water contained therein. The chamber 1 is adapted to be supported upon the upper end of a lower cylinder 10 provided on its lower end with a faucet 11. An ice box 12 is arranged within the lower cylinder 10, preferably at the central portion thereof, the upper end of the walls of which are stopped below the upper end of the walls of the lower chamber 10 so as to receive the auxiliary chamber 3 within the lower cylinder. While said ice box may be permanently constructed in the lower cylinder 10, as shown in Fig. 1, I prefer to detachably secure said ice box to the lower cylinder 10 by means of a threaded flange 12ª, which engages a correspondingly threaded boss 10ª formed on the bottom of the lower chamber 10, as shown in Fig. 3. When the device is in use, ordinary river or reservoir water, more or less contaminated, may be poured into the receiving chamber or boiler 1, and the boiler then placed upon a heating apparatus of any suitable construction and the water sterilized by boiling. The receiving chamber is then placed upon the top of the lower cylinder 10 and the drip-cock 9 opened, so as to allow the water in said chamber to pass through the filtering bulbs, and from the hollow interior of said bulbs into the auxiliary chamber 3, and from said chamber into the interior of the lower cylinder 10. When in said cylinder the water is thoroughly cooled by means of the ice 13 contained within the ice box 12, and may be withdrawn through the faucet 11, as required. The water, in dripping from the auxiliary chamber into the lower cylinder, becomes aerated and exposed to the cooling effect of the ice, making the drinking water absolutely free from pathogenic bacteria, filtered, aerated and cooled.

In the construction herein shown and described, I have embodied my invention in one of its desirable forms. I do not desire to be limited to such construction, however, as my invention is capable of modifications in many respects without departing from the spirit thereof, and I, therefore, wish to include other devices having similar capabilities. Thus, if desired, the auxiliary chamber 3 may be dispensed with and the water passed directly from the filtering chamber into the lower cylinder 10, as shown in Fig. 4. When such construction is used I prefer to incline the outer portion 14 of the bottom of the receiving chamber 1 upwardly and outwardly from the central portion 15 thereof, as shown in Fig. 4. By means of such construction the drip cocks 9ª which are attached to the filters arranged within the receiving chamber are free from contact with the bottom of said chamber, and therefore protected from injury when the receiving chamber is placed over a fire or heater. The lower central portion of the bottom of the receiving chamber is placed upon the top of the ice box 12, in substantially the same manner as the auxiliary chamber 3 is placed upon the top of the ice box 12 in the construction shown in Fig. 1.

Having thus described my invention, what I claim new and desire to secure by Letters Patent is:

1. The combination of a receiving chamber provided with an auxiliary chamber having a drip outlet, a filter arranged within said receiving chamber communicating with said auxiliary chamber, and a lower receptacle adapted to support the receiving chamber and provided with an open ended ice box arranged centrally of said lower chamber, bearing at its upper end against said auxiliary chamber, substantially as shown and described.

2. The combination with a receiving chamber having a filter arranged therein, and an auxiliary chamber connected with said filter and provided with a drip outlet, and a lower chamber provided with a centrally disposed detachable ice box extending at its upper end to said auxiliary chamber, substantially as shown and described.

3. The combination with a receptacle having an open end, of an ice box arranged within said receptacle and spaced from the wall thereof to form a water chamber, and having its upper end terminated short of the upper end of the said receptacle, a receiving chamber detachably mounted on the top of said receptacle and ice box, and a filter arranged within said receiving chamber and provided with an outlet opening into said water chamber, substantially as shown and described.

4. The combination with a receptacle having an open end, of an ice box arranged within said receptacle with its upper end terminated short of the upper end of said receptacle a receiving chamber detachably mounted on the top of said receptacle and ice box, and a filter comprising a spherical perforated head having a neck detachably secured to the bottom of said receiving chamber, layers of filtering material covering said head, and an outlet communicating with the interior of said receptacle, substantially as shown and described.

5. The combination with a receptacle having an open end, of an ice box arranged within said receptacle and spaced from the wall thereof to form a water chamber and having an upper end terminating short of the upper end of the receptacle, a receiving chamber detachably mounted on the top of said receptacle, and a filter arranged within said receiving chamber and provided with an outlet opening into said water chamber, substantially as shown and described.

6. The combination with a receptacle having an open end, of an ice box arranged within said receptacle having its upper end terminated short of the upper end of the receptacle, a receiving chamber detachably mounted on the top of said receptacle, and provided with a bottom contracted centrally in diameter adapted to bear on the top of said ice box, and a filter arranged within said receiving chamber and provided with an outlet arranged above the contracted central portion of the bottom of said chamber, substantially as shown and described.

In testimony whereof I have signed my name to this specification in the presence of two subscribing witnesses.

PETER A. AURNESS.

Witnesses:
 NILS F. GARBO,
 KATHARINE BAER.